Mar. 3, 1925.  1,528,433
G. A. KAY
FREE FLOATING COUPLING
Filed July 11, 1923
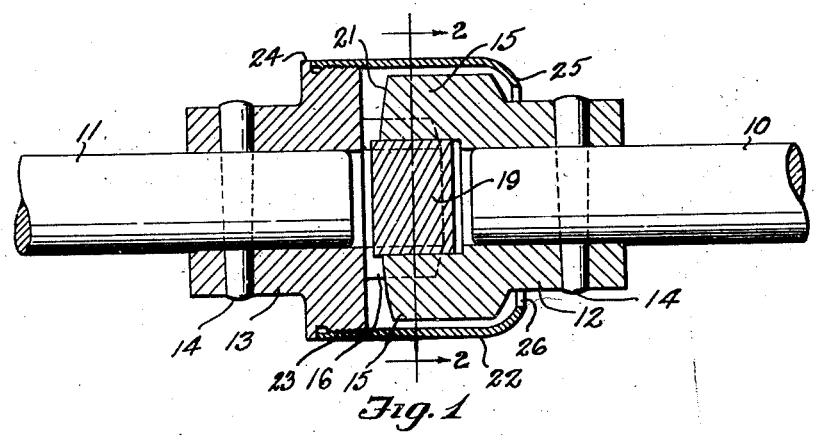
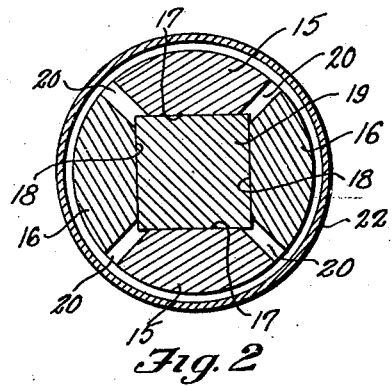
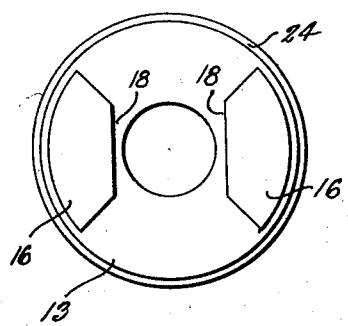 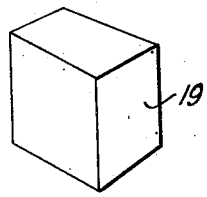 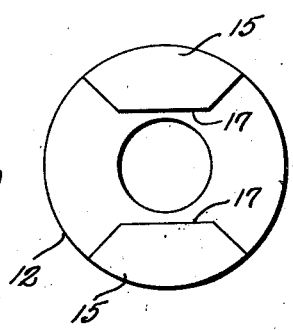
INVENTOR.
George A. Kay.
BY Wooster & Davis
ATTORNEYS.

Patented Mar. 3, 1925.

1,528,433

UNITED STATES PATENT OFFICE.

GEORGE A. KAY, OF NORWALK, CONNECTICUT, ASSIGNOR TO THE WHITNEY ENGINEERING COMPANY, OF NORWALK, CONNECTICUT, A CORPORATION OF CONNECTICUT.

FREE-FLOATING COUPLING.

Application filed July 11, 1923. Serial No. 650,811.

*To all whom it may concern:*

Be it known that I, GEORGE A. KAY, a citizen of the United States, residing at Norwalk, county of Fairfield, State of Connecticut, have invented a new and useful Free-Floating Coupling, of which the following is a specification.

This invention relates to couplings for shafts, drill spindles, and the like, and has for an object to provide an improved floating coupling adapted to connect for rotation in unison two shafts or the like which are slightly out of alignment, either laterally or angularly or both, and which may also allow a certain longitudinal movement of the shafts.

It is a further object of the invention to provide a coupling of this type which will be simple and substantial in construction, which will comprise a small number of parts, which will be of long life, which will not have projections which are liable to be caught on objects near the coupling, and which may quickly be assembled and disassembled.

It is a still further object of the invention to provide a coupling of this type in which the so-called hori gori motion is eliminated.

With the foregoing and other objects in view I have devised the construction illustrated in the accompanying drawing, in which—

Fig. 1 is a central longitudinal section through the coupling in position between two sections of shaft, the shafts being shown in elevation.

Fig. 2 is a transverse section substantially on line 2—2 of Fig. 1.

Fig. 3 is an end elevation of the left hand coupling member shown in Fig. 1 and looking from the right.

Fig. 4 is a similar view of the right hand coupling member looking from the left, and Fig. 5 is a perspective view of the coupling block.

Two sections of shaft are shown at 10 and 11 although the coupling may be used for connecting two sections of drill spindles or the like. A coupling comprises two complementary coupling members 12 and 13 which have longitudinal openings for receiving the ends of the shaft sections, and to which shaft sections these members are secured by any suitable means such as keys or pins 14. These coupling members are provided on their opposed faces with a pair of spaced projecting lugs, the lugs on the member 12 being shown at 15 and on member 13 at 16. The two lugs are similar to each other except reversed and the lugs of one pair are similar to the other pair. The lugs of each pair are provided with spaced parallel opposed bearing surfaces 17 and 18 respectively between which is adapted to fit the square connecting block 19, and the spaces between the surfaces 17 and 18 are open at their ends so that the block may slide between these surfaces transversely of the axes of the shafts and parallel with the surfaces. In the preferred assembly the lugs 15 and 16 are interposed as shown in Fig. 2, the lugs 15 engaging one pair of the opposite sides of the block and the lugs 16 engaging the other pair of the opposite sides of the block, but these lugs are so proportioned that when assembled there is clearance space between them, as shown at 20, so as to allow relative movement between the coupling members when shaft sections which are out of alignment are rotated. The ends of the lugs 15 and 16 are also perfectly rounded or curved somewhat at their free ends as shown at 21 to allow them to assume relative angular positions when the shaft sections are out of alignment angularly. When assembled the coupling members should also be so located as to allow some clearance at the opposite ends of the block 19.

Means are also provided for enclosing the coupling so as to give a smooth outer surface and thus prevent exterior objects being caught in the coupling, to keep dirt from the coupling, and also to hold a lubricant. I have shown a simple and desirable form of casing in the drawing, comprising a cylindrical shell 22 which is internally threaded at one end, as indicated at 23, for threaded engagement with one of the coupling members 13. This member is also provided with a stop shoulder 24 to engage the end of the shell to limit its movement. At its other end the shell is curved inwardly as shown at 25 and embraces the other coupling member 12, but the opening 26 is of sufficient diameter to allow the member 12 to have both angular and lateral movement.

It will be apparent from an inspection of the drawing, that to compensate for relative movements between the two coupling members 12 and 13, if the shafts are in misalignment, the block 19 may have movement in all directions laterally of the axes of the shafts. If for instance the two lugs 15 move vertically, as viewed in Fig. 2, the block will slide on the parallel surfaces 18. If these lugs move horizontally as viewed in Fig. 2 they will slide on the block, the block remaining stationary, or if these lugs have a movement laterally between these vertical or horizontal movements there will be a relative movement between the block and all of the lugs 15 or 16. As the block is square and the bearing surfaces on the lugs are parallel and fit the opposite sides of the square the rotative movement of one pair of lugs is exactly equal to that of the other pair of lugs at any point throughout a revolution, and so the two sections of shaft will rotate in exact unison and there will be no hori gori movement between them as is common in couplings of other constructions. It will also be apparent that the machine work required in fitting the block and the lugs is very simple as it requires merely straight milling, and the surfaces are flat and parallel. As the surfaces are flat and parallel a good fit may be easily secured and the coupling will be very durable because there will be a large bearing surface. In view of this large bearing surface, as the movement of the block relative to the lugs is very small, there will be very little wear between them. It will still further be apparent that the construction is a substantial one and therefore there will be little likelihood of breakage. Also as the lugs are interposed the longitudinal dimension may be made short so that the coupling requires a comparatively small space. It is especially to be noted that in this coupling the hori gori motion is eliminated, and the two sections of shafting connected move together throughout the entire revolution.

Having thus set forth the nature of my invention, what I claim is:

1. A shaft coupling comprising a pair of complementary coupling members each provided with a pair of lugs having spaced parallel opposed inner surfaces and substantially cylindrical outer surfaces with the end walls extending substantially radially thereof, and a block substantially square in cross section between the said surfaces adapted to slide laterally between said surfaces and parallel therewith, the lugs of one coupling member being located between the lugs of the other coupling member with the end walls of adjacent lugs spaced from each other.

2. A shaft coupling comprising a pair of complementary coupling members each provided on their opposed faces with a pair of spaced lugs, the two lugs of each pair having spaced parallel faces, a substantially square block between said faces, one of said members being externally threaded and provided with a shoulder at the inner end of said threaded portion, and an internally threaded shell threaded on said member with its end against said shoulder, the other end of the shell having an opening for passage of the other member and of greater diameter than said member.

In testimony whereof I affix my signature.

GEORGE A. KAY.